3,257,272
BIPHENYL AND 4-CHLORO-2-PHENYLPHENOL HOUSEFLY REPELLENTS
George F. Shambaugh, Wooster, Ohio, and Morris R. Rogers, Framingham, Arthur M. Kaplan, Waban, and John J. Pratt, Jr., Wayland, Mass., assignors to the United States of America as represented by the Secretary of the Army
No Drawing. Filed Apr. 2, 1964, Ser. No. 356,988
6 Claims. (Cl. 167—31)

The invention described herein, if patented, may be manufactured and used by or for the Government for governmental purposes without the payment to us of any royalty thereon.

This invention relates to insect repellent and more particularly to housefly repellents.

The housefly (Musca domestica) is a common insect that is found in nearly all of the habitable areas of the world. This prolific pest is known to be responsible for the transmission of disease to man by mechanically carrying the disease organism from a contaminated source to food. Typhoid is one such disease known to be so transmitted and many other bacterial and viral diseases are suspected of being similarly transmitted. For reasons of health and sanitation, then, it is important to control this undesirable insect.

The control of the housefly, however, has been extremely difficult because of the ability of this insect to rapidly develop resistance to chemical insecticides. New instances of resistance are continually being reported from all parts of the world. Those insecticides which have been the object of widespread use are now considered to be of little value in controlling the housefly and those insecticides which are known to still be effective are, in general, too toxic for widespread use. For these reasons, other methods of controlling houseflies have been investigated and one method that currently shows promise is the use of repellent materials.

We have discovered that 4-chloro-2-phenylphenol and biphenyl are highly effective housefly repellents. The compounds of this invention are effective at low concentrations, e.g., a repellent effect is observed from surfaces containing less than 5 mg./sq./ft. of either compound. The compounds are slightly soluble in water and soluble in most organic solvents, e.g., kerosene, aromatic hydrocarbons, naphtha, acetone, etc., and may be utilized in solutions, emulsions, fogs or aerosols and may be applied to the areas or spaces to be protected by brushing or spraying. The repellents of this invention may be present in the carrier in amounts as low as 500 p.p.m.

Repellency of these compounds to houseflies was determined by the method of La Brecque and Wilson as described in "The Florida Entomologist" vol. 42, No. 4, December 1959. A semi-circle of filter paper is rolled into the shape of a funnel and placed in the top of a glass beaker forming an inverted cone trap. Five grams of an attractant, a commercial casein hydrolysate (Edamin T), were placed in the bottom of each of two inverted cone traps and a wire screen placed over the attractant in order to prevent the trapped flies from feeding. The filter paper cone of one trap was treated with the repellent compounds of this invention and the filter paper cone of the other trap was treated with the solvent used or left untreated. The two traps were placed in a cage containing 100 flies. The traps were left in the cage for 30 minutes and the number of female flies in each trap counted. Only females were considered because they are more strongly attracted to the attractant than are males. The test was valid only if five or more female flies entered the control trap. The results are based on at least six replications conducted on three or more different days.

A repellency index was calculated using the formula:

$$\frac{T-C}{T+C} \times 100$$

where T equals the number of female flies in the repellent-treated trap and C equals the number in the control trap. Essentially this expresses in percentage the flies in the repellent-treated trap less those caught in the control trap. A repellency index of −100 signifies 100% repellency, i.e., no female flies entered the repellent-treated trap. Conversely, a repellency index of +100 signifies 100% attractancy, i.e., no female flies entered the control trap. A repellency index of −33 has been established as the level of significant repellency.

*Example I*

The repellency index of 4-chloro-2-phenylphenol and biphenyl was determined at concentrations ranging from 3.125 mg./sq./ft. to 200 mg./sq./ft. Solutions of these two compounds in acetone were impregnated on the paper cones and air dried and tested as outlined above. The table set forth below summarizes the results observed.

TABLE 1

| Compound | Repellency Index at Various Concentrations (mg./sq./ft.) | | | | | | |
|---|---|---|---|---|---|---|---|
| | 200 | 100 | 50 | 25 | 12.5 | 6.25 | 3.125 |
| 4-chloro-2-phenylphenol | −100 | −100 | −87.0 | −39.0 | −12.8 | −8.3 | +4.2 |
| Biphenyl | −91.8 | −90.2 | −88.0 | −65.8 | −49.0 | −24.1 | −24.9 |

These repellents are suitable for use in every area from which it is desired to repel houseflies. Examples of such areas include dumps, refuse piles, decaying plant material, garbage racks, latrines, etc. These compounds work well in the presence of organic matter and at concentrations normally employed are essentially odorless.

While we have disclosed preferred embodiments of our invention, it will be understood that modification may be made without departing from the spirit and scope of our invention.

We claim:
1. A method of repelling houseflies which comprises subjecting said houseflies to the action of an effective amount of a compound selected from the group consisting of biphenyl and 4-chloro-2-phenylphenol.
2. A method of repelling houseflies which comprises subjecting said houseflies to the action of an effective amount of biphenyl.
3. A method of repelling houseflies which comprises subjecting said houseflies to the action of an effective amount of 4-chloro-2-phenylphenol.
4. A method of repelling houseflies from a surface infested by houseflies which comprises depositing at least 5 mg. of a compound from the group consisting of biphenyl and 4-chloro-2-phenylphenol on each square foot of said infested surface.
5. A method of repelling houseflies from a surface infested by houseflies which comprises depositing at least

5 mg. of biphenyl on each square foot of said infested surface.

6. A method of repelling houseflies from a surface which comprises depositing at least 5 mg. of 4-chloro-2-phenylphenol on each square foot of surface.

References Cited by the Examiner

UNITED STATES PATENTS

| | | | |
|---|---|---|---|
| 1,969,963 | 8/1934 | Britton | 167—31 |
| 2,164,328 | 7/1939 | Hay | 21—43 |
| 2,298,681 | 10/1942 | Coleman | 167—24 |

FOREIGN PATENTS 895,671  11/1953  Germany.

OTHER REFERENCES

Chemical Abstracts, 52: 14071e (1958).
Wolcott, Journal of Economic Entomology, volume 46, No. 2, pages 374 to 375, April 1953.

JULIAN S. LEVITT, *Primary Examiner.*

J. D. GOLDBERG, *Assistant Examiner.*